Oct. 18, 1960 A. F. LUND 2,956,887
METHOD AND SYSTEM FOR PROCESSING FRUIT JUICES
Filed Aug. 8, 1957
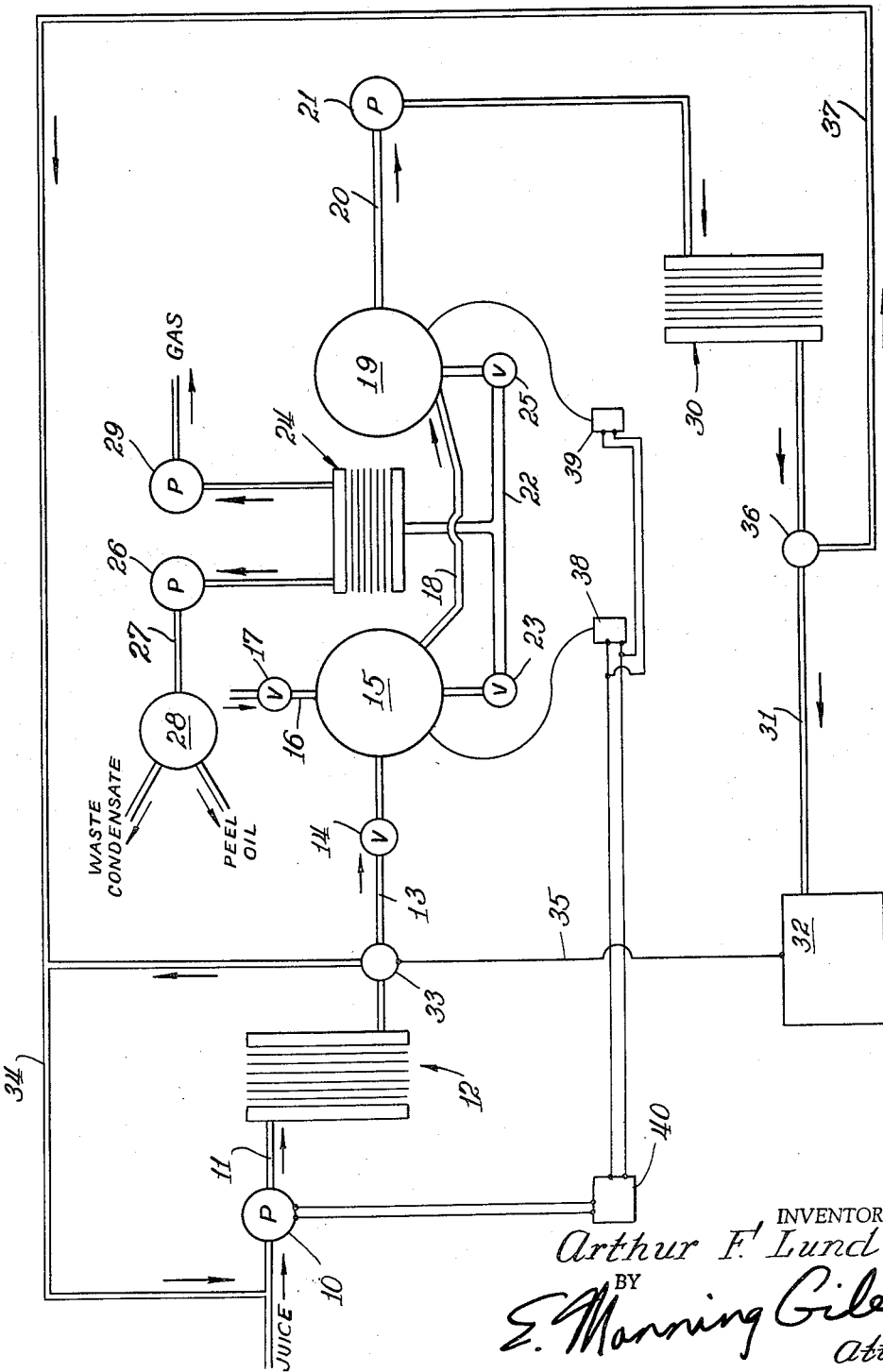
INVENTOR.
Arthur F. Lund
BY
E. Manning Giles
Atty.

United States Patent Office 2,956,887
Patented Oct. 18, 1960

2,956,887

METHOD AND SYSTEM FOR PROCESSING FRUIT JUICES

Arthur F. Lund, Mission, Kans., assignor to Cherry-Burrell Corporation, Chicago, Ill., a corporation of Delaware Filed Aug. 8, 1957, Ser. No. 676,999

3 Claims. (Cl. 99—205)

My invention relates to a method and system of apparatus for processing fruit juices such as orange juice, grape fruit juice, and tangerine juice, and has reference more particularly to removal of peel oil and air from such juices by steam distillation.

In extracting juice commercially from citrus fruit it is important to obtain as much juice as possible from the fruit. This requires considerable squeezing of the fruit which tends to cause some oil present in the skin of the fruit to be removed with the juice.

While the oil content in commercially squeezed juice varies with different fruit and different types of juice extraction equipment, it is common for the peel oil content to range from .035 to .07 percent and the content may sometimes be as high as .10 percent.

The legal limits for peel oil content in citrus juices established by the United States Department of Agriculture are: orange juice .03 percent; grape fruit juice .02 percent; and tangerine juice .015 percent.

The reason for limiting the peel oil content is that the peel oil has a tendency to turn rancid and to impair the flavor and food value of the juice.

Citrus juices for infant consumption require further peel oil removal since the lemonine peel oil tends to cause the formation in babies of gas which they are unable to "burp." The baby food people prefer reduction of peel oil content in juices for infant consumption to below .005 percent, and preferably to .002 percent.

Conventional de-oiling equipment is costly and is limited as to its peel oil removal capacity and the citrus fruit juice industry has demanded a process and equipment which will do a more efficient peel oil removal job at less cost.

Commercial equipment for squeezing citrus juices also presents the further problem of air entrainment. Air becomes intermixed with the juice as it is squeezed and becomes partially absorbed in it. This creates a foaming problem in subsequent handling and processing of the juice, particularly in filling juice containers where it is necessary to overfill in order to insure that as the foam settles and air escapes the remaining juice will not be at too low a level. Moreover, the presence of air entrained in the juice tends to impair its keeping quality.

It is the object of my invention to provide a process for the removal of peel oil from citrus juice which is capable of reducing the peel oil content to in the range of from .002 to .005 percent where desired.

It is also an object of my invention to develop such a process which can readily be controlled to vary the degree of peel oil removal.

It is another object of my invention to devise a process which permits recovery of the peel oil so that it may be used or sold commercially.

It is a further object of my invention to provide a method and means for removing air which may be entrained in the juice.

It is a still further object of my invention to devise a system of equipment for peel oil extraction and deaeration of citrus juices which is efficient and moderate in cost and which requires a minimum of floor space for its installation, these and other objects being accomplished as hereinafter described, reference being had to the accompanying drawing in which the figure is a schematic representation of a system of equipment for extracting peel oil in accordance with my invention.

Referring now to the drawing, the system of equipment which I have developed for extraction of peel oil from citrus juice starts with a pump designated by the reference numeral 10. Citrus juice passes from the pump 10 through a duct 11 to a preheater 12. The preheater 12 is preferably a plate-type heat exchanger of the type disclosed in Newhall Patent No. 2,639,126, granted May 19, 1953, for Plate Apparatus and Press. Juice may be introduced into the preheater 12 at a temperature in the range of from 40° to 90° F. and passes through a flow passage between alternate sets of plates in the preheater 12. Hot water of a sufficient temperature to heat the juice to a temperature in the range of 140° to 180° F. is circulated through a flow passage in the spaces intervening between the spaces through which the juice passes. Thus juice and hot water are flowing through alternate spaces and there is instant heat transfer from the water through the intervening plates to the citrus juice.

From the preheater 12 the juice passes through a duct 13 and through a pressure operated valve 14 which is preferably of the type described in co-pending patent application of William M. Haselton, Serial No. 657,656, filed May 7, 1957, for Vacuum Relief Valve, although any suitable valve may, of course, be used. From the valve 14, the juice is sprayed into an enclosed air-tight first chamber 15 of a twin-chamber vacuum steam processor preferably of the type disclosed in co-pending patent application of John C. Walsh and William M. Haselton, Serial No. 618,241, filed October 25, 1956, for Vacuum Steam Processor, now Patent No. 2,944,479. Steam which has been de-superheated, dried, and purified is then introduced into the chamber 15 through a duct 16. The steam passes through a valve 17 which may be adjusted to increase or reduce the flow of steam into the chamber 15. The steam and juice become commingled within said first chamber 15 and are preferably caused to flow in a spiral pattern around the inner surface of the walls of said chamber to an outlet (not shown) at the bottom of the chamber 15. The juice then flows through a duct 18 to the top of the second chamber 19 of the vacuum steam processor where it is preferably introduced tangentially near the top of said chamber and caused to flow in a spiral pattern around the inside walls of said chamber 19 to an outlet (not shown) at the bottom of the chamber 19 where juice is withdrawn through a duct 20 by a pump 21.

A vapor withdrawal duct 22 communicates through a valve 23 with the first chamber 15 and communicates directly with the second chamber 19. Said vapor withdrawal duct 22 is connected centrally to a plate-type condenser 24. A valve 25 is provided at the end of the duct 22 adjacent the second chamber 19 to regulate the depth of vacuum therein. A pump 26 connected to the outlet of the condenser 24 is adapted to evacuate liquid and entrained gas therefrom. A second pump 29 removes air and condensibles from the condenser 24. The pump 26 must be of sufficient capacity, in cooperation with the pumps 21 and 29 connected to the second chamber 19, to maintain sub-atmospheric pressure in the chambers 15 and 19. The valves 23 and 25 may be adjusted to maintain 9 to 11 inches Hg vacuum in the first chamber 15 and 23 to 25 inches Hg vacuum in the second chamber 19.

Cold water is circulated through the plate-type condenser 24 so that vapors from the chambers 15 and 19 entering the condenser 24 and coming in contact with the heat exchange plates are cooled sufficiently to be condensed. The liquid condensate accumulates at the bottom of the condenser 24 and is then withdrawn by the pump 26 therefrom.

The condensate, which consists of water and peel oil along with other condensed volatiles that may have been removed from the citrus juice in the chambers 15 and 19, passes through a duct 27 to a separator 28, which may be any suitable commercial separator but is preferably of the two-stage centrifugal type. In this separator 28 peel oil is removed from the liquid condensate.

Juice from the chamber 19 is circulated by the pump 21 to a plate-type pasteurizer 30 where the juice is heated to pasteurizing temperature, approximately 190° F. From the pasteurizer 30 the juice passes through a duct 31 to a can filler 32 where it is packaged.

By varying the temperatures and pressures in the chambers 15 and 19, the intensity of the de-oiling treatment can be increased or reduced. Also, since the pasteurizer 30 and the preheater 12 are of similar design, these may, if desired, be coupled together so that the two are separate sections of the same unit. Likewise, for greater efficiency it may be desirable to use water that has been circulated through the condenser 24 as the heat exchange medium for preheating the juice in the preheater 12. The water which serves as a cooling medium in the condenser 24 may be heated by the condensation of the vapor to a sufficient temperature to preheat the juice in the preheater 12.

A flow diversion valve 33 may be provided in the line 13 from the preheater to the first chamber 15 with a return line 34 back to the inlet side of the pump 10. The flow diversion valve 33 is connected through an electrical circuit 35 to the can filler 32 in a manner to close the flow diversion valve 33 when the can filler 32 reaches its capacity. Thus citrus juice passing through the preheater 12 may be diverted through the return line 34 for recirculation through the preheater 12 until the liquid level in the can filler 32 drops sufficiently to cause the flow diversion valve 33 to open and permit citrus juice to resume passing through the line 13 and the valve 14 to the first chamber 15.

Likewise, a flow diversion valve 36 may be provided in the duct 31 from the pasteurizer 30 to the can filler 32, said flow diversion valve 36 being thermostatically controlled to close when the temperature of the juice discharged by the pasteurizer 30 is below a predetermined level so as to cause juice to be redirected back through the return duct 37 and the return line 34 to the inlet side of the pump 10 to cause recirculation of the juice through the entire system. When the temperature of the juice discharged by the pasteurizer 30 reaches the desired level, the flow diversion valve 36 opens and the juice is passed directly through the duct 31 to the can filler 32.

Vacuum switches 38 and 39 may be connected to the chambers 15 and 19, respectively, and are connected electrically through the magnetic starter 40 with the pump 10. The vacuum switches 38 and 39 are set so that when the pressure in either the first chamber 15 or the second chamber 19 rises above a desired level the pump is shut off so that no juice is circulated through the system. When sufficient vacuum is reestablished in either of the chambers 15 or 19 the vacuum switch 38 or 39, as the case may be reactivates the magnetic starter 40 to place the pump in operation.

The foregoing controls, while not essential to the practice of my invention, are refinements which improve the performance and reduce the amount of attention required by the system.

While I have shown my invention in a preferred form, I am aware that various modifications can be made therein without departing from the spirit of my invention, the scope of which is determined by the appended claims.

I claim:
1. The method of treating citrus juice containing a volatilizable component comprising the steps of: preheating said juice; spraying said preheated juice into a first vacuum chamber; introducing steam at a temperature higher than the preheated juice into said vacuum chamber in direct heat exchange contact with the spray particles of said juice to heat said juice and condense some of said steam; passing said juice and condensed steam mixture into a second vacuum chamber maintained at a higher vacuum than said first chamber; evaporating in said second chamber the condensed steam together with the volatilizable component from said juice; withdrawing and collecting the thus treated juice from the second chamber; and withdrawing and condensing the vaporized steam and volatilizable component from said second chamber.

2. The method of treating citrus juice containing peel oil comprising the steps of: preheating said juice to a temperature in the range of 140° to 180° F.; spraying said preheated juice into a chamber maintained at a pressure of 9 to 11 inches Hg vacuum; introducing desuperheated, dried, and purified steam into said chamber in direct heat exchange contact with the spray particles of said juice to further heat said juice, thereby to vaporize some of said peel oil and condense some of said steam; withdrawing and condensing said vaporized peel oil from said chamber; passing said juice and condensed steam mixture into a second chamber maintained at a pressure of 23 to 25 inches Hg vacuum; vaporizing substantially all the condensed steam and remaining peel oil from said juice; withdrawing and condensing said vaporized peel oil and steam from said second chamber; and withdrawing and collecting the treated juice from said second chamber.

3. The method of removing peel oil from citrus juice which comprises the steps of: preheating citrus juice containing peel oil to a temperature in the range of 140° to 180° F.; further heating such juice by incorporating steam therewith in a zone of sub-atmospheric pressure; transferring such juice and incorporated steam to a second zone of sufficiently lower pressure to cause vaporization of said steam and peel oil; withdrawing and collecting juice from said second zone; withdrawing vaporized steam and peel oil from said second zone and condensing same to form a liquid condensate; and separating and collecting peel oil from said condensate.

References Cited in the file of this patent
UNITED STATES PATENTS

| | | |
|---|---|---|
| 2,513,813 | Milleville | July 4, 1950 |
| 2,625,505 | Cross | Jan. 13, 1953 |
| 2,631,103 | Karmer | Mar. 10, 1953 |
| 2,708,167 | Nanz | May 10, 1955 |